United States Patent [19]
Erlichman

[11] 3,852,781
[45] Dec. 3, 1974

[54] VARIABLE DRIVE FOR PHOTOGRAPHIC APPARATUS

[75] Inventor: Irving Erlichman, Wayland, Mass.

[73] Assignee: Polaroid Corporation, Cambridge, Mass.

[22] Filed: Nov. 23, 1973

[21] Appl. No.: 418,656

[52] U.S. Cl.................. 354/86, 222/102, 354/304
[51] Int. Cl. ........................................... G03b 17/50
[58] Field of Search .............. 354/86, 304; 222/102

[56] References Cited
UNITED STATES PATENTS

| | | | |
|---|---|---|---|
| 2,455,125 | 11/1948 | Land.............................. | 354/304 X |
| 2,516,398 | 7/1950 | Land et al...................... | 354/304 X |
| 3,604,329 | 9/1971 | Land.............................. | 354/304 X |
| 3,618,493 | 11/1971 | Erlichman........................... | 354/86 |

Primary Examiner—Richard L. Moses
Attorney, Agent, or Firm—Alfred E. Corrigan

[57] ABSTRACT

A self-developing camera containing a pair of pressure-applying rollers that contact an advancing exposed film unit and distribute a processing liquid within the film unit, a manually reciprocatable drawer for transporting the film unit, and a variable speed drive system to vary the driving force applied by the rollers to the film unit in proportion to variations in resistance to movement of the film unit resulting from the surface configuration of the film unit. The drive system increases the driving force applied to the film unit by the rollers in the thicker regions of the film unit.

14 Claims, 5 Drawing Figures

VARIABLE DRIVE FOR PHOTOGRAPHIC APPARATUS

BACKGROUND OF THE INVENTION

The present invention relates to article conveying apparatus which is particularly useful for transporting and processing photosensitive film elements within photographic apparatus such as a self-developing camera.

Self-developing cameras are known in the art and include a housing providing a light-free environment for a film pack and the components of the apparatus adapted to process the film after exposure. The film pack includes a plurality of stacked self-developing film units. Each film unit includes a photosensitive element located in face-to-face relation with an image-receiving element and a rupturable container from which a processing liquid is dispensed between the elements in response to the application of compressive pressure to the rupturable container. The film unit may have a trap at its rear end to collect and retain excess processing liquid. Film units of the subject type are disclosed, for example, in U.S. Pat. No. 3,607,285 issued Sept. 21, 1971 to Richard J. Chen.

After exposure, the uppermost film unit is moved between the rollers so that the processing liquid is distributed between the elements of the film unit. The camera is preferably of the folding type, and consequently the apparatus for advancing the exposed film unit must occupy a minimum of space both when the camera is erected and when folded.

One known film transport system utilizing a manually reciprocatable drawer for transporting the exposed film unit is disclosed and claimed in my U.S. Pat. No. 3,618,493 issued Nov. 9, 1971. In this system, racks movable with the reciprocatable drawer engage pinions to rotate one of the rollers. The thickness of the layer of processing liquid spread between the elements of each film unit as it passes between the processing rollers is influenced by the speed of advancement of the film unit. Variations in the thickness of the processing liquid layer may lead to imperfections in the developed photograph. To improve the consistency and uniformity of film processing, the patented structure employed a speed governing device for controlling the speed of rotation of one of the rollers.

SUMMARY OF THE INVENTION

A principal object of the present invention is to provide a novel, improved system for processing an exposed film unit by drawing the film unit between a pair of rollers and varying the driving or advancing force applied to the film unit by the rollers to assist in achieving a more uniform distribution of processing liquid over the photosensitive element in the film unit. Another object of the present invention is to provide novel drive means for varying the driving force applied by a roller to an article being conveyed in contact with the roller in proportion to variations in resistance to the movement of the article past the roller.

A presently preferred embodiment of the invention comprises a folding, self-developing type camera with a manually reciprocatable drawer which transports a film unit after exposure. The drawer has on opposite sides discontinuous toothed racks to selectively engage two separate gear trains. The gear trains have different mechanical advantages and alternately rotate one of a pair of processing rollers between which the film unit is passed. The higher mechanical advantage gear train is operative only when the rupturable container for the processing liquid and the trap for excess liquid at opposite ends of the film unit are passing through the bite of the rollers. The lower mechanical advantage gear train rotates the processing roller during the passage of the remainder of the film unit between the rollers.

While having particular utility in the field of photographic apparatus, especially in folding self-developing cameras, the conveying and drive system may be utilized in other applications to compensate for variations in the thickness of articles being conveyed.

The above and other objects, features and advantages of the invention will become more apparent as this description proceeds.

DETAILED DESCRIPTION OF THE INVENTION

Figure 1:
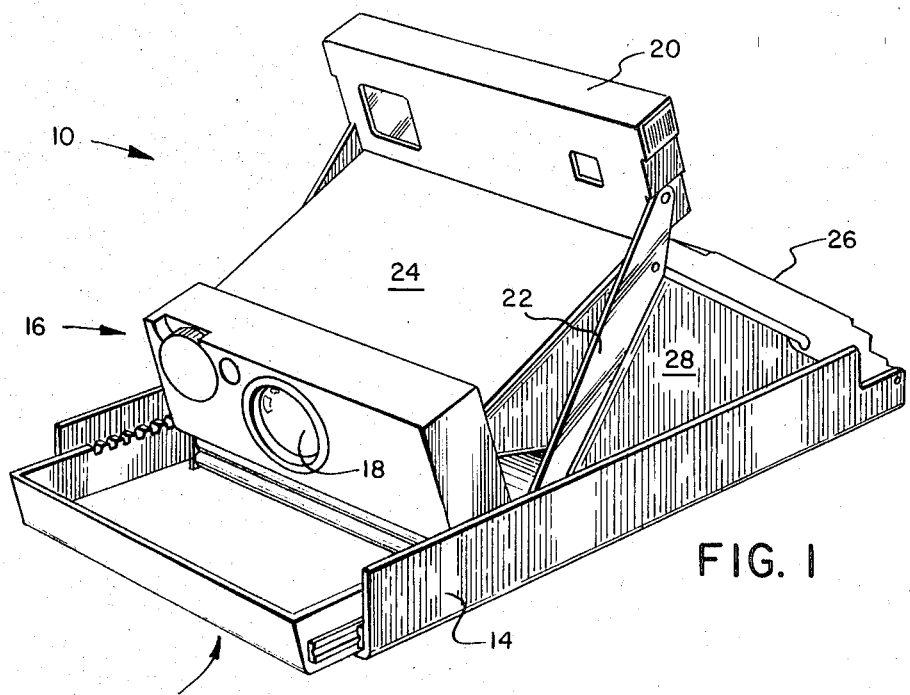
FIG. 1 is a perspective view of a self-developing camera in accordance with the present invention in the erected position and with a drawer in a partially withdrawn position.

Referring now to the drawings and more particularly to FIG. 1, reference numeral 10 generally designates a folding self-developing camera which is shown in the erected position. The camera 10 includes transport means in the form of a reciprocatable drawer 12 which is adapted to be retracted within a camera outer wall 14 when the camera is in the folded inoperative position. A forward housing secton 16 encloses an exposure system including a shutter and a lens 18. A combined view and rangefinder 20 is supported by links 22, a forward cover panel 24, and a rear cover panel 26. A flexible envelope or bellows 28 is utilized to provide a light-tight chamber through which light is transmitted from the camera lens to a photosensitive element positioned for exposure within a film cassette, as shown in broken lines in FIG. 3.

Figure 5:
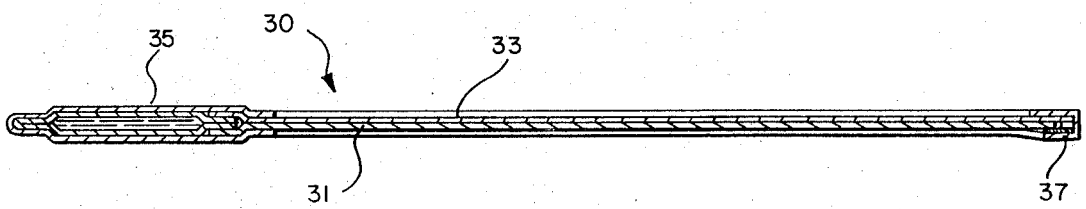
FIG. 5 is a cross-section of a film unit with which the instant invention is especially adapted for use.

The camera of this invention is designed to be employed with photosensitive film packs of the type disclosed in the aforementioned U.S. Pat. No. 3,607,285. These film packs comprise a plurality of superposed self-developing film units 30 (FIG. 5). Each film unit preferably includes an opaque, sheet-like photosensitive element 31 and a transparent sheet-like image-receiving element 33, disposed in face-to-face relationship, a rupturable container or pod 35 for processing liquid at the leading edge of the unit, and a trap 37 at the trailing edge of the unit for receiving and trapping excess processing liquid. The rupturable container 35 and the trap 37 are both thicker than the remainder of the film unit and present greater resistance to movement when the exposed film unit is drawn through processing rollers as described hereinafter.

Figure 3:
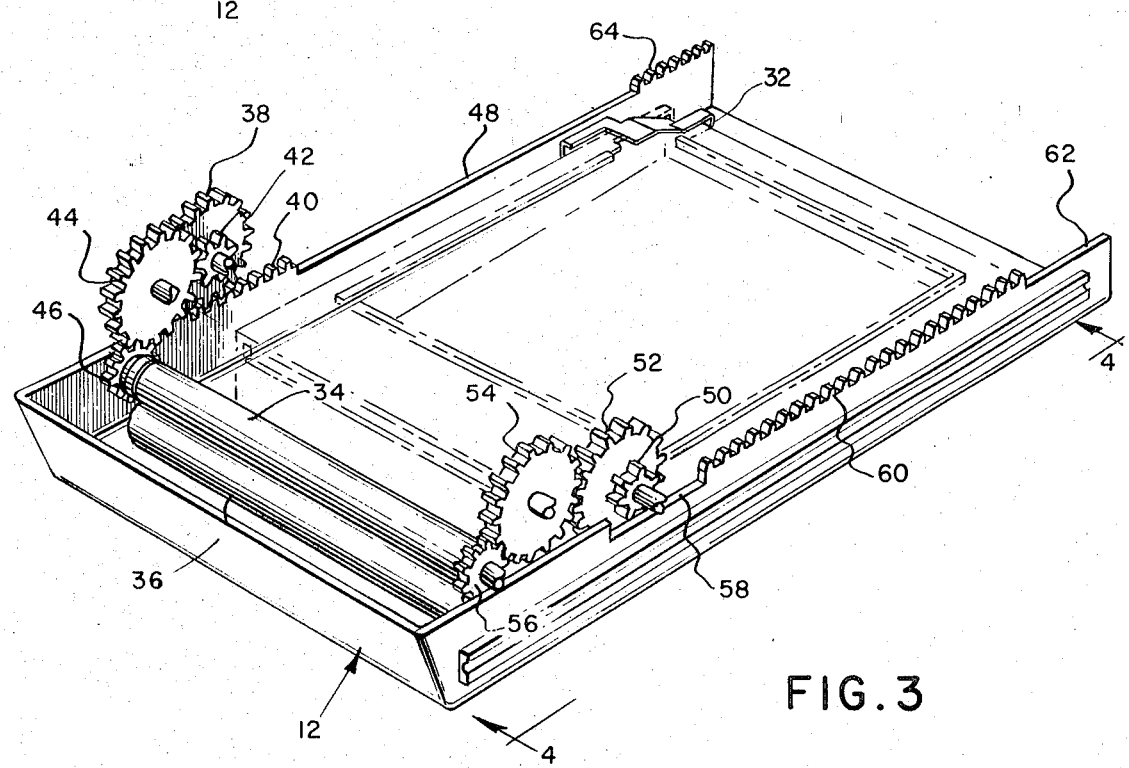
FIG. 3 is a perspective view illustrating the film transporting drawer and associated structure of the present invention.
Figure 2:
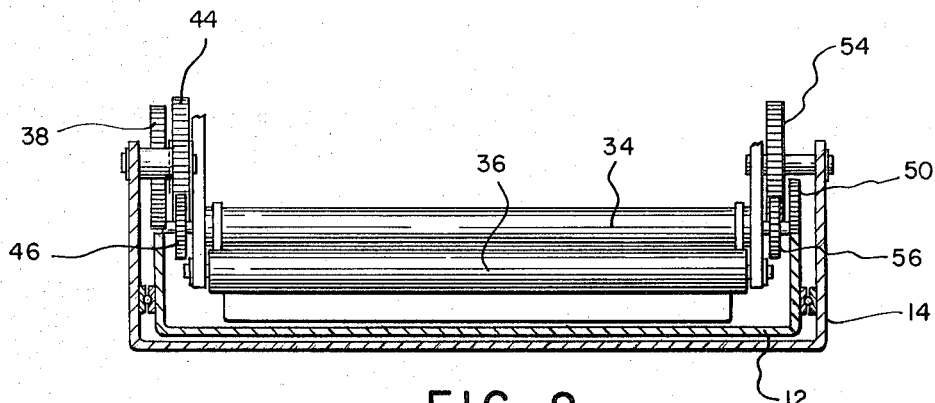
FIG. 2 is an elevational view showing the processing rollers of the present invention.

After exposure, drawer 12 is manually moved to the left as viewed in FIG. 3. This movement results in rotation of roller 34 and the uppermost film unit 30 being engaged by a resilient member 32, which is preferably connected to the rear end of manually reciprocatable drawer 12, and moved toward the nip of rollers 34 and 36. Upon manual movement of drawer 12 outwardly, the rupturable container 35 at the leading edge of the exposed film unit is advanced by member 32 into the nip between a pair of juxtaposed pressure-applying rollers 34, 36 which are supported upon the camera housing 14. Lower roller 36 is preferably biased towards the upper roller 34 by resilient means (not shown) in order to accommodate the varying thicknesses of the film unit. Continued movement of the drawer 12 to the left results in the rollers rupturing the pod 35 and spreading its processing contents between elements 31 and 33 to initiate formation of a visible image therein while simultaneously advancing the film unit to the exterior of the camera. As will be more fully explained hereinafter, rollers 34 and 36 advance the film unit 30 at a faster rate than drawer 12 is being moved to the left, thereby resulting in the trailing end of the film unit moving out of engagement with member 32 as the rollers advance the film unit. Final movement of the drawer 12 to the left results in the film unit being ejected from between the rollers and deposited in the drawer where it may be removed by the user.

Referring to FIG. 3, when the processing liquid container of the film unit is disposed in the bite between rollers 34 and 36, the upper roller 34 is rotated by a gear train comprised of a pinion gear 38, which is driven by engagement with a toothed rack 40 which covers part of the upper surface of the side wall of drawer 12, a smaller gear 42 which is coaxial with pinion gear 38, an intermeshing gear 44, and a driven gear 46 which is mounted on the shaft of upper roller 34. Since pinion gear 38 is larger than gear 42 which is coaxial with it, for a given rotation of pinion gear 38, a given point on gear 42 will move a shorter distance but with more force so that an increase in mechanical advantage is achieved. This increased force is then transmitted via gears 44 and 46 to the roller 34 to provide a greater driving force to assist in overcoming the resistance of the rupturable container passing through rollers 34, 36. The length of rack 40 is such that the rear end of the rack disengages from pinion gear 38 just after the ruptured container from which the processing liquid has been expelled exits from the nip between the rollers 34, 36. Immediately behind rack 40, there is a reduced height wall section 48 so that when wall section 48 is beneath pinion gear 38 there is no contact between these members.

A second gear train for rotating roller 34 when the first gear train is inoperative and vice versa is located at the right-hand end of roller 34 as seen in FIG. 3. The second gear train comprises a small pinion gear 50, a larger gear 52 which is coaxially mounted on the same shaft as gear 50, an intermeshing gear 54, and a driven gear 56 which is mounted on the shaft of roller 34.

Figure 4:
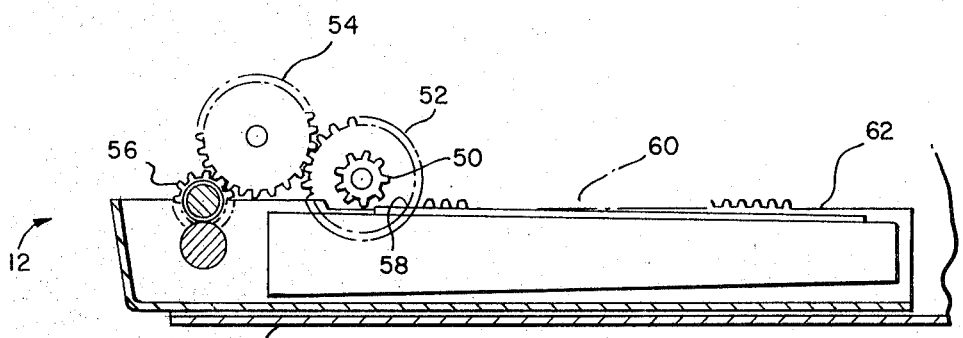
FIG. 4 is a partial elevational view showing one of the drive gears of the invention in inoperative position relative to its associated rack.

FIG. 4 illustrates that when the pinion gear 38 of the first gear train is being rotated by movement of rack 40, the small pinion gear 50 of the second gear train is disengaged and is capable of rotating with its teeth out of contact with a reduced height wall section 58 of the wall of the drawer 12. This wall section 58 is directly opposite and equal in length to the rack 40 which actuates the first gear train. When the ruptured processing liquid container leaves the bite of rollers 34, 36 and the first gear train is rendered inoperative; the pinion gear 50 of the second gear train is engaged and rotated by a toothed rack 60 directly behind the wall section 58. The length of rack 60 corresponds to the length of the thin main section of film unit between the container 35 and the trap 37. In addition, rack 60 has the same length as and is directly opposite the reduced height section 48 on the opposite wall of the drawer 12.

The thin main section of the film unit affords less resistance to the film unit being pulled through the rollers. Accordingly, less driving force need be applied to the film unit by the rollers. Since pinion gear 50 is smaller than the coaxially mounted gear 52, gear 52 rotates at a higher speed than gear 50. Intermeshing gear 54 and gear 56 on the shaft of roller 34 likewise are rotated at higher speed than pinion gear 50 but with less force. The differences in speed and mechanical advantage are proportional to the differences in the number of gear teeth on gears 50 and 52.

At the end of rack 60 there is another short reduced height wall section 62 so that in this region the pinion gear 50 is disengaged. Opposite reduced height wall section 62 on the other wall of the drawer 12 there is a short toothed rack 64 which engages the large pinion gear 38 of the first gear track while the trap at the trailing end of the film unit is being drawn through the rollers.

In operation, the first gear train is operative to apply greater driving force to roller 34 while the obstructions at both ends of the film unit are drawn through the rollers, and the second gear train is operative to rotate roller 34 while the constant thickness thinner main section of the film unit is drawn through the rollers. In this fashion, the difference in the mechanical advantages between the two gear trains can be utilized to make the rate at which the film unit is drawn through the rollers more uniform. The high mechanical advantage first gear train is operative while both the rupturable container 35 at the leading edge and the trap 37 at the trailing edge of the film unit are passing through the rollers, and the low mechanical advantage but higher roll speed producing second gear train is operative over the remainder of the film unit. For purposes of illustration, the gear ratio between large pinion gear 38 and the smaller gear 42 of the first gear train may be 2:1, and the gear ratio between the small pinion gear 50 and gear 52 of the second gear train may be 1:2.

While the invention has been shown and described with particularity as embodied in a folding self-developing camera, it will be appreciated that the invention may be utilized in other photographic apparatus, and also in other systems where the selection of different drive systems dependent upon variations in an article being conveyed would be advantageous.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Apparatus for conveying an article comprising:
   roller means including at least one roller contacting the surface of an article being conveyed during movement of the article past said roller means;
   transport means for supporting and transporting the article to said roller means; and drive means coupled with said roller and said transport means and actuated by said transport means to vary the driving force applied by said roller to the article in proportion to variations in resistance to movement of the article past said roller means.

2. Apparatus according to claim 1 wherein said drive means vary the speed of rotation of said roller in proportion to variations in the surface configuration of the article contacting said roller.

3. Apparatus according to claim 1 wherein said drive means include first gear means and second gear means and means actuated by movement of said transport means to, in sequence, engage said first gear means to drive said roller at one speed and then to engage said second gear means to drive said roller at another speed.

4. Apparatus according to claim 3 wherein said last-mentioned means comprise a first gear rack on said transport means engageable with said firt gear means over a portion of the path of movement of said transport means, and a second gear rack on said transport means positioned to engage said second gear means over another portion of the path of said transport means.

5. Photographic apparatus comprising:
means for locating a film unit in position for exposure;
processing means including at least one roller mounted in position to receive one end of the film unit and spread a processing liquid across a photosensitive element of the film unit while simultaneously advancing the film unit away from said exposure position;
means for engaging and moving the film unit, subsequent to exposure, from said exposure position into engagement with said processing means; and
drive means coupled with said processing means for varying the driving force applied by said processing means to the film unit in proportion to variations in resistance to advancement of the film unit through said processing means.

6. Photographic apparatus as defined in claim 5 wherein said drive means includes first and second power trains alternately coupled in driving relation with said processing means.

7. Photographic apparatus as defined in claim 6 wherein said drive means includes manually operable means.

8. Photographic apparatus as defined in claim 7 further including means for connecting said engaging means to said manually operable means.

9. Photographic apparatus as defined in claim 7 wherein said manually operable means includes means for receiving and supporting the film unit subsequent to its passage between said processing means.

10. Photographic apparatus as defined in claim 9 further including means for mounting said manually operable means for movement between a first position wherein said receiving and supporting means is located substantially within said photographic apparatus and a second position wherein said receiving and supporting means is located at least partially outside said photographic apparatus.

11. In photographic apparatus having means for locating a film unit in position for exposure, means for engaging and advancing the film unit after exposure, means for distributing a processing liquid across a photosensitive element of the film unit, and means for supporting the film unit advanced by said distributing means; the improvement comprising:
drive means coupled with said distributing means and said supporting means to, at predetermined intervals, vary a driving force applied by said distributing means to the film unit proportional to variations in resistance to advancement of the film unit through said distributing means.

12. Apparatus according to claim 11 wherein said distributing means include at least one roller engaging a surface of the film unit during advancement by said distributing means.

13. Apparatus according to claim 11 wherein said supporting means comprise a manually reciprocatable support member.

14. Apparatus according to claim 13 wherein said drive means include first and second racks connected to said support member and reciprocatable therewith, and first and second gears for driving said distributing means sequentially at different speeds, said first rack being positioned to actuate said first gear during a portion of the path of advancement of the film unit and said second rack being positioned to actuate said second gear during another portion of the path of advancement of the film unit.

* * * * *